United States Patent [19]

Gauger

[11] 4,089,778

[45] May 16, 1978

[54] PROCESS FOR SEPARATING A SUBSTANCE FROM A LIQUID MEDIUM CONTAINING THE SUBSTANCE IN DISSOLVED FORM

[75] Inventor: Jürgen Gauger, Geneva, Switzerland

[73] Assignee: The Battelle Development Corporation, Columbus, Ohio

[21] Appl. No.: 474,166

[22] Filed: May 29, 1974

[30] Foreign Application Priority Data

May 29, 1973 Switzerland .................. 7696/73

[51] Int. Cl.² .............................................. B01D 13/00
[52] U.S. Cl. ............................... 210/23 F; 210/433 M
[58] Field of Search .................... 210/23, 321, 433, 73, 210/44, 259

[56] References Cited

U.S. PATENT DOCUMENTS

| | | | |
|---|---|---|---|
| 3,519,558 | 7/1970 | Cooper et al. | 210/23 |
| 3,630,937 | 12/1971 | Baum et al. | 210/58 X |
| 3,836,200 | 9/1974 | Booth | 210/58 X |
| 3,839,206 | 10/1974 | Welch | 210/321 X |

FOREIGN PATENT DOCUMENTS 548,246   11/1957   Canada .................. 210/321

*Primary Examiner*—Frank A. Spear, Jr.
*Attorney, Agent, or Firm*—Karl F. Ross; Herbert Dubno

[57] ABSTRACT

Into a liquid medium consisting of a solvent having dissolved therein a substance (solute) which is to be separated from the liquid medium, there is introduced a macromolecular substance capable of selectively fixing the molecules of the substance to be separated. The macromolecular substance forms, before and after fixing the substance to be separated, a homogeneous liquid phase in admixture with the liquid medium. After allowing the substance to be fixed by the molecules of the macromolecular substance, the liquid medium thus obtained is passed through a semipermeable ultrafiltration membrane which retains the associations of molecules formed between the macromolecular substance and the substance to be separated but allows the molecules of the solvent to pass through.

17 Claims, No Drawings

PROCESS FOR SEPARATING A SUBSTANCE FROM A LIQUID MEDIUM CONTAINING THE SUBSTANCE IN DISSOLVED FORM

BACKGROUND OF THE INVENTION

Separation techniques in which semipermeable membrances are used are already known. For example, in one process known as inverse osmosis, a liquid solution is passed through a semipermeable membrane under a pressure higher than the osmotic pressure of this solution in order to separate at least one substance dissolved in this solution. This process can be used for example for the desalination of sea water.

In another process known as ultrafiltration, ultrafiltration membranes are used. These ultrafiltration membranes are generally made of synthetic or natural polymeric substances, especially cellulose derivatives, and have pore diameters of, for example, from 50 to 100,000 Angstroms. By applying ultrafiltration, it is possible to separate from a liquid medium all the substances which are dissolved or dispersed in it in the form of molecules or agglomerates of molecules with dimensions greater than those of the pores of the ultrafiltration membrane used. In view of the pore sizes of the filtering membranes which can be used for carrying out this particular process, the molecular weight of the substances which can be separated from a liquid medium by this process is at least equal to approximately 5000. Accordingly, the field of application of this process extends for example to the separation of substances of biological origin which have a high molecular weight, for example proteins and enzymes.

In certain fields, inverse osmosis, ultrafiltration and known separation techniques of the same kind have numerous technical and economic advantages over other conventional separation techniques such as distillation, solvent extraction, crystallisation, etc., notably by virtue of the fact that these processes, which use semipermeable membranes, do not involve any change of phase either in regard to the substances to be separated or in regard to the solvents.

However, these processes do have certain limitations, notably in the case of inverse osmosis, due to the non-existence of semipermeable membranes with the necessary characteristics for use on an industrial scale in a non-aqueous medium and, in the case of ultrafiltration, due to the fact that it is not possible by this technique selectively to separate substances with a molecular weight of below about 5000 on an industrial scale.

In addition, it is not possible by inverse osmosis to separate substances with low molecular masses, such as simple or complex metal ions, from substances of high molecular weight, such as proteins, synthetic resins in solution, etc.

In addition, it has already been proposed selectively to separate substances with a molecular weight of less than 5000, for example complex metal ions, from a liquid medium containing these substances in solution, by fixing the molecules of these substances to macromolecular materials in solid form, notably to ion-exchange resins. This process has the advantage of extreme effectiveness in regard to the degree of separation, but unfortunately is accompanied by a low yield from the point of view of the ratio between the mass of macromolecular substance used and that fraction of this substance which performs an active function in separation. In addition, this process is not suitable for continuous working, which precludes its use on a commercial scale.

It is an object of the present invention to overcome the foregoing disadvantages.

SUMMARY OF THE INVENTION

The process of the invention is distinguished by the fact that at least one macromolecular substance capable of selectively fixing the molecules of the dissolved substance (solute) is incorporated in said medium, said macromolecular substance forming, before and after fixing of these molecules, a homogeneous liquid phase in admixture with said liquid medium. After a period of time long enough to enable at least a substantial fraction of the molecules of the substance to be separated to be fixed by the molecules of the macromolecular substance, the liquid medium thus obtained is brought into contact with a semipermeable ultrafiltration membrance capable of retaining the associations of molecules formed between the macromolecular substance and the substance to be separated while allowing to pass at least the molecules of said solvent. Pressure is applied to this medium to an extent sufficient to separate it into a retentate containing said associations of molecules, and a permeate containing at least the molecules of the solvent.

DESCRIPTION OF THE PREFERRED EMBODIMENTS

The process according to the invention is based on the use of macromolecular fixing materials in dissolved form (for example in the form of genuine solutions, colloidal solutions or even in the form of agglomerates of molecules corresponding to an intermediate state between a genuine solution and a colloidal solution) in the liquid medium containing the substances which it is required to separate.

The process according to the invention enables the disadvantages of conventional processes to be obviated. In particular, it provides for continuous working and integral utilization of the theoretical retention capacity of the macromolecular substances used.

The process according to the invention enables at least one substance in solution, having a molecular weight of less than 5000, to be selectively separated from a liquid medium containing it. By virtue of the fact that the process according to the invention can be carried out at ambient temperature or even at a temperature below ambient temperature, it can be used with particular advantage for separating one or more substances of low molecular weight from a liquid medium additionally containing other substances without denaturing those substances and the substance(s) to be separated. On the other hand, the process according to the invention can be used with particular advantage for separating a substance present in heavy dilution in a liquid medium, for example ions of metals present in traces in effluents.

Accordingly, the process according to the invention can be used with advantage in numerous industrial fields, for example in the food industry, chemical and pharmaceutical industries, in the petrochemicals industry and in the treatment of effluents.

In the food industry, in particular, the process according to the invention can be used for eliminating undesirable substances present in foods or beverages, such as beer, liquid coffee, milk, fruit juices, without in any way affecting the organoleptic properties thereof.

In the chemical and pharmaceutical industries, the process according to the invention can be used for isolating and purifying natural biologically active substances, for example vitamins, and for isolating optically active compounds, etc.

In the petrochemical industry, the process according to the invention can be used for eliminating and, optionally, recovering traces of catalysts present in hydrocarbons.

In the treatment of effluents, the process according to the invention can be used for purification, desalination, for eliminating traces of heavy metals, organic substances, especially toxic organic substances, etc.

The macromolecular substance capable of selectively fixing the molecules of the substance to be separated can be, for example, a substance in the form of a solution of macromolecules, each of which is capable of fixing the substance to be separated.

In particular, it is possible to use a macromolecular substance whose molecules are capable, in solution, of fixing the substance to be separated through a phenomenon of complex formation. These complexes can vary in nature: for example, they can be complexes proper or chelates or even complexes formed by charge transfer.

The ability of the macromolecular substance to fix the substance to be separated can also result from the formation of bonds of the reinforced hydrogen bridge type, or even from an interaction phenomenon of the "dipole-dipole" type.

Examples of macromolecular substances capable, when in solution in the form of non-associated molecules, of forming proper complexes with certain substances of low molecular weight, include polyvinylalcohol, polyacrylamide, polyvinylpyrrolidone, polyacrylates, dextrans, pectic acid, water-soluble or water-dispersible proteins in aqueous medium, and polyacrylic acid, polyamides, etc. in non-aqueous medium.

Macromolecular substances whose molecules are capable of forming chelates are, generally, polymers containing at least two adjacent electron-donor groups, especially polyvinylalcohol, polyvinylpyrrolidone, etc.

Examples of macromolecular substances whose molecules are capable of forming complexes by charge transfer include polymers containing electron-donor groups, for example aryl groups, unsaturated alkyl groups, aryl-alkyl groups, especially alkylbenzene groups, or even anilino groups or alkylated aniline-derivative groups or alkylamino, pyridono groups, etc. It is also possible to use polymers containing electron-acceptor groups, for example groups derived from quinones, halogenated quinones, from tetracyanoethylene, from tetracyano-7,7,8,8-dimethane, from trinitrobenzene, from picric acid, from picryl chloride, from tetranitromethane, from maleic anhydride, from anhydrides of tetrahalogenated phthalic acid, from halogens, from the group $SO_2$, etc. Polyamides, proteins, polyacids, polysulphonic acids, etc., are all examples of macromolecular substances whose molecules are capable of fixing a substance of low molecular weight through the formation of bonds of the reinforced hydrogen bridge type, or through interactions of the dipole-dipole type.

It is also possible to use a macromolecular substance in the form of a solution or dispersion of aggregates of molecules. Aggregates of molecules of this kind can be considered as a "microphase" separate from the rest of the liquid medium. The substance which it is desired to separate tends to be distributed between these "microphases" and the rest of the medium and, once equilibrium has been reached, the distribution of the concentrations of this substance between the "microphases" and the rest of the medium obeys Nernst's law of distribution.

These aggregates of molecules can be made up of reticulated macromolecules. At least one of the following substances for example can be used as the macromolecular substance capable of forming such aggregates of reticulated macromolecules: polyvinylalcohol, methoxylated polyvinylether, a copolymer of styrene and maleic anhydride, polyvinylpyrrolidone, a polyamide, especially polyhexamethylene adipamide (for example the product known commercially by the name Nylon 66), polyisobutylene, an acrylic resin, especially sodium polyacrylate, etc.

The molecule aggregates can also be made up of branched macromolecules. At least one of the following substances for example can be used as the macromolecular substance capable of forming such aggregates of branched macromolecules: branched polyolefins, especially branched polyethylene, amylo-pectin, branched alginate, branched polyesters, branched silicones, etc.

Various procedures can be adopted for forming aggregates of macromolecules in a liquid medium. In particular, aggregates of reticulated macromolecules can be formed by reacting, in the liquid medium, a polymer containing free hydroxyl groups, for example polyvinylalcohol, with a bifunctional compound containing suitable reactive groups, for example a dialdehyde, a diisocyanate, a diamine, etc. It is also possible to react an unsaturated polymer, for example polyisobutylene, with a divinyl compound, for example divinylbenzene. Aggregates of reticulated macromolecules can also be formed by polymerising a monomer in the liquid medium in the presence of a small quantity of a reticulating agent. For example, to form aggregates of reticulated polystyrene molecules, styrene can be polymerized in the presence of a small quantity of divinylbenzene.

It is also possible to form aggregates of macromolecules by reacting one or more monomers in suitable proportions in a solvent selected in such a way that the homopolymer or copolymer obtained is only partly soluble in the liquid medium.

It is also possible to use as the macromolecular substance a substance with a natural tendency to form aggregates of molecules, for example a surface-active polymer. In particular, it is possible to use nonylphenoxy-poly (ethyleneoxide) ethanol (this product corresponds to the general formula

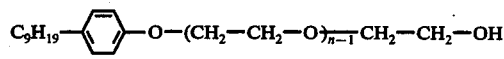

and is commercially available under the name Antarox CO 990 where $n = 100$, which corresponds to a molecular mass of the order of 6000). It is also possible to use a copolymer of propylene oxide, ethylene oxide and ethylene diamine corresponding to the general formula:

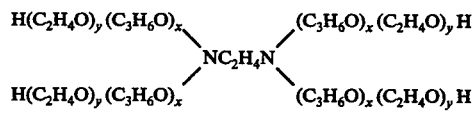

and having a molecular mass of the order of 5600, the average value of $x$ being 21.5 and the average value of $y$ being 3.2, or even a polyether with a molecular weight of more than 5000.

The filtering membrane used can be an already known type of membrane, such as the membranes used for carrying out separation processes based on ultrafiltration.

For example, it is possible to use filtering membranes with a porosity of from 50 to 100,000 Angstroms made of one of the following materials: cellulose acetate, cellulose nitrate, regenerated cellulose, polyamide, gelatin, alginate, polyvinyl chloride, etc.

The separation process is generally based on exploiting the difference of at least one physicochemical property between the macromolecules or the "microphases" and the liquid phase performing the function of solvent or dispersant for the solution or dispersion containing the substance(s) to be separated, or even between several types of macromolecules or microphases. If necessary, the difference of at least one physicochemical property between two dissolved substances which it is desired to separate is also exploited.

The difference of at least one physicochemical property which is exploited to obtain the separating effect can relate, for example, to polarity, to the ability to form hydrogen bonds, to the ability to form complexes, etc.

This difference of at least one physicochemical property results in a difference in concentration of the substance(s) to be separated between the microphases and the rest of the liquid medium. For example, in the case of a solution of a polar substance in a non-polar or weakly polar solvent, the introduction of polar "microphases" (for example "microphases" of the kind obtained from a weakly crosslinked, polar polymer, especially polyvinylalcohol) into this solution results in the attraction and retention of the polar substance of the solution by these microphases. Accordingly, it is possible to obtain a distribution of the polar substance between the microphases and the rest of the liquid medium to the benefit of the microphases.

In cases where the solution contains, in addition to the aforementioned polar substance, a substance that is non-polar or less polar than this first substance as solute, a change in the ratio of the concentrations of the solutes is obtained after contact with the microphases because the solution becomes poor in the polar substance, but retains a content equal or similar to its original content of the less polar substance. Accordingly, it is sufficient to leave the solution in contact with the macromolecular substance for a period of time long enough for the equilibrium of concentration of dissolved substance to be separated to be established between the solution and the macromolecules or the "microphases" of the macromolecular substance, and subsequently to filter the solution through a filtering membrane, for example an ultrafiltration membrane, which allows through both the solvent and the dissolved fraction which has not been retained by the microphases, but which retains the molecules or the "microphases" of the macromolecular substance to terminate separation. Accordingly, the permeate thus obtained is a solution poor in dissolved polar substance. The retentate, which consists of molecules or of "microphases" retaining a certain proportion of the polar substance, can be suitably treated to separate the polar substance from the macromolecular substance in cases where the ultimate objective of the operation is to extract said polar substance. For example, the molecules or microphases of macromolecular substance can be brought into contact with a solvent which is more polar than they are and which, hence, shows a greater affinity for the polar substance. Alternatively, the molecules or the "microphases" may simply be heated in cases where the polar substance lends itself to separation by distillation, etc.

The macromolecular substance may optionally be reused after use by removing the substance extracted from the aqueous medium in known manner. This is particularly useful in cases where that substance is continuously removed.

If the ultimate objective of the process is merely to modify the ratio of the concentrations of at least two substances dissolved in a solvent, the substance(s) retained by the microphases need not be separated unless it is desired to reuse the microphases for another operation.

Similarly, by using a macromolecular substance in the form of non-polar or weakly polar microphases, for example "microphases" of a weakly branched polymer such as branched polyethylene, it is possible, in a solution containing at least one polar substance and at least one non-polar or weakly polar substance dissolved in a solvent having a higher polarity than the microphases, either to modify the ratio of the concentrations of the solutes in favor of the substance(s) having the higher polarity, or to extract the solute having the lower polarity.

Similarly, in the case of a solution in a solvent, for example methanol, having no real ability to form chelate complexes, of a substance having a marked tendency to form chelate complexes, for example ortho-aminophenol, and of a substance having similar physicochemical properties but a lower tendency to form chelate complexes, for example para-aminophenol, it is possible to obtain a separation of the two aminophenol isomers either with a view to extracting at least one of them or with a view to enriching the solution with that isomer which has the weakest tendency to form chelate complexes, by using microphases formed from a heavily branched substance, for example an alginate, having a greater ability to form chelate complexes than the solvent. In this particular case, the microphases preferentially retain the ortho-aminophenol molecules, and it is sufficient to filter the solution through an ultrafiltration membrane retaining the microphases but allowing through both the solvent and the aminophenol molecules to obtain the required separation. In this case, the permeate consists of the solvent containing in solution a certain quantity of para-aminophenol from the initial solution and that fraction of ortho-aminophenol which has not been retained by the microphases. The retentate consists of the microphases retaining, in the form of chelate complexes, a certain proportion of the ortho-aminophenol which was present in the starting solution.

The para-aminophenol can then readily be separated in substantially pure form from the "permeate" solution, for example by distillation, and the ortho-aminophenol separated from the microphases by any suitable process, for example by heating to a temperature high enough to break the complex, or by extracting the ortho-aminophenol with a suitable solvent.

Instead of using only one type of microphase, it is also possible to use several types of microphases, especially in cases where the distribution factor of the substance which it is required to separate between a given microphase and the solvent would be too low to allow significant separation in a single operation, or in cases where it is desired to separate at least two different substances.

For example, in the case of a solution of a substance having a relatively high polarity and of a substance with a lower or with zero polarity in a given solvent, it is possible to obtain separation of these two substances by simultaneously using non-polar microphases consisting, for example, of a non-polar weakly branched polymer, such as branched polyethylene, and polar microphases consisting, for example, of a polar, weakly crosslinked polymer, such as polyvinylalcohol, because the dissolved substance with the higher polarity is preferentially retained by the polar microphases, while the dissolved substance with the lower or zero polarity is preferentially retained by the non-polar microphases. If the dimensions of the polar microphases are greater than those of the non-polar microphases (the dimensions of the first being, for example, of the order of 500 A and those of the second being, for example, of the order of 100 A), it is sufficient to filter the solution containing these microphases through an ultrafiltration membrane with pore sizes (for example of the order of 200 A) such that the largest microphases (in the present case the polar microphases) are retained whilst the smallest microphases (the non-polar microphases) pass through the membrane to obtain separation of the two substances dissolved in the starting solution. This is because the substance with the lowest polarity enters the permeate because it is fixed to the small microphases which are either non-polar or have a lower polarity than the solvent, whilst the substance with the highest polarity remains in the retentate because it is fixed to the large microphases. Said substances can then readily be separated from the microphases, to which they are respectively fixed, by any suitable method, for example by heating or by extraction with solvents for which these substances have a higher affinity than they show towards the microphases to which they are fixed.

An entirely analogous case can be found in the hypothesis of a solution in a given solvent of three different substances, namely a substance with a relatively high polarity, a substance that is non-polar or has a relatively low polarity and a substance showing a marked aptitude for forming chelate complexes with suitable microphases (for example microphases consisting of a polymer containing electron-donor groups situated relative to one another in a position that is sterically favorable to the formation of chelate complexes, especially an alginate). In this case, the three dissolved substances can be separated by using, in addition to microphases capable of forming the aforementioned chelate complexes, microphases with a lower polarity than the solvent (for example microphases consisting of a polymer of low polarity, such as branched polyethylene). The separation effect is obtained through the phenomenon by which the non-polar substance capable of forming chelate complexes is preferentially fixed to the microphases which have the same aptitude (microphase of a polymer with electron-donor groups suitably situated from the steric point of view) and by which the weakly polar solvent which is unable to form chelate complexes is preferentially fixed to the microphases of low polarity. The polar substance remains in solution in the solvent, to a certain extent at least. If the dimensions given to the microphases capable of forming the chelate complexes are greater (for example of the order of 1000 A) than those of the non-polar microphases which are unable to form complexes (their dimensions being, for example, of the order of 100 A), the required separation can be obtained by filtering the solution containing the two types of microphases through an ultrafiltration membrane whose pore sizes are such (for example of the order of 200 A) that the largest microphases (in the present case those capable of forming chelate complexes) are retained, while the smallest microphases (in the present case the nonpolar microphases which are unable to form chelate complexes) pass through the membrane. The non-polar substance with an ability to form chelate complexes remains in the filtration retentate fixed to the large microphases. By contrast, the non-polar substance which does not have any ability to form chelate complexes and the polar substance enter the permeate, being fixed to the small microphases and dissolved, respectively. The weakly polar substance fixed to the large microphases in the filtration retentate can be separated, for example, by heating or by extraction in the same way as in the preceding case. The permeate can be subjected to another ultrafiltration through an ultrafiltration membrane whose pore sizes (for example of the order of approximately 50 A) are such that the "small" microphases are retained while the solvent and the polar substance pass through. In the new "permeate" resulting from this operation, the polar substance can be separated from the solvent, for example by distillation, while in the new "retentate" the weakly polar substance can be separated from the microphases by heating, by extraction or by any other suitable method. It is clear that the number of possible embodiments of the invention is not limited to the particular cases which have just been described. For example, obvious variations of these particular cases resulting from an inversion of the polarity character or ability to form chelate complexes between the solvent and the microphases.

The time required to establish an equilibrium between the microphases and the solvent is generally very short, for example of the order of a few seconds or a few minutes. In certain cases, however, for example when the "microphases" have dimensions in excess of about 10,000 A, or when the diffusivity of the substance to be fixed is low, the time required to establish the equilibrium can be as much as thirty minutes.

In certain cases, especially in cases where microphases of surface-active subtances are used, it is advisable to add a suitable solvent on the retentate side as filtration progresses in order to avoid any significant change in the concentration of these microphases in the solution which could result in an undesirable modification in those microphases and, possibly, in premature desorption of the substance(s) fixed to them.

EXAMPLE 1

1% by weight of weakly crosslinked polyvinylalcohol with a molecular weight of the order of 200,000 is dispersed in water, 3.5 g of caffeine being subsequently dissolved in 350 ml of the resulting dispersion.

The dispersion containing the caffeine in solution is then passed through an ultrafiltration membrane of regenerated cellulose with an average porosity of the order of 50 to 100 Angstroms by applying a pressure of 34 kg/cm$^2$ to the liquid. The rate of flow corresponds to an output of permeate of 19.7 ml in 75 minutes (for a useful membrane surface of the order of 25 cm$^2$).

Analysis by spectrophotometry at a wavelength of 274 millimicrons shows that the absorption of a sample of permeate diluted to one thousandth (i.e. brought to a concentration which would correspond to 0.001% of caffeine in the initial solution) is equal to 0.352. A sample of a 0.001% solution of caffeine has an absorption of 0.518, still at a wavelength of 274 millimicrons. A sample of a 1% solution of polyvinylalcohol dissolved at 95° C in water, as indicated above, has an absorption of zero. Accordingly, it can be concluded that 32% of the caffeine have been eliminated from the treated solution.

The dispersion of polyvinylalcohol in water is formed as follows:

6 g of polyvinylalcohol with a molecular weight of the order of 200,000 are progressively introduced into 73 ml of water heated to a temperature between 60° and 70° C, the liquid being stirred so as to obtain a viscous, clear and homogeneous liquid. This liquid is allowed to cool while stirring to ambient temperature, followed while stirring is continued by the addition in small fractions of 16 ml of methanol, by the dropwise addition of 4 ml of a 0.05% by weight solution of terephthalic dialdehyde in methanol, and finally by the dropwise addition of 1 ml of 0.1 N aqueous solution of hydrochloric acid. Approximately 100 ml of a viscous, clear and homogeneous liquid containing approximately 6% by weight of weakly crosslinked polyvinylalcohol are obtained in this way. Finally, the concentration of the polymer is adjusted to approximately 1% by weight by mixing the liquid while stirring vigorously with 500 ml of water at ambient temperature.

EXAMPLE 2

3.5 g of sodium polyacrylate with a molecular weight of the order of 200,000 are progressively dissolved in 50 ml of water by dispersing this quantity of polyacrylate in water with vigorous stirring and subsequently adding, with continued stirring, approximately 50 ml of a solution of soda, containing 5% by weight of NaOH, in small fractions such that the addition of each fraction produces a change in the pH of the order of one unit, the liquid being maintained at a temperature of the order of 90° C. The liquid thus obtained then has added to it the quantity of water required to increase its volume to 350 ml, followed by the dissolution of 3.5 g of caffeine therein. The pH-value of the liquid medium thus obtained is between 12 and 13.

The liquid is allowed to cool to a temperature of the order of 40° to 50° C, and is then filtered through an ultrafiltration membrane identical with that used in Example 1 under a pressure of 34 kg/cm$^2$. The rate of flow of the filtrate amounts to 10 ml in 51 minutes (for a useful membrane surface of the order of 25 cm$^2$).

Analysis of a sample of permeate diluted to one thousandth (concentration which would correspond to 0.001% of caffeine in the initial solution) by spectrophotography at a wavelength of 274 millimicrons shows that 86% of the quantity of caffeine in the initial solution has been eliminated from the treated solution (absorption equal to 0.518 before treatemt, i.e. for a caffeine concentration of $10^{-5}$, and to 0.085 which corresponds to a caffeine concentration of $0.14 \cdot 10^{-5}$ after the treatment which has just been described).

EXAMPLE 3

1% by weight of albumin is dissolved in an aqueous solution of caffeine containing 1% by weight of caffeine, after which the homogeneous liquid thus obtained (which has a pH-value of the order of 5) is filtered through an ultrafiltration membrane identical with that used in accordance with Example 1 under a pressure of 10 kg/cm$^2$.

Analysis carried out in the same way as described in Examples 1 and 2 shows that 43% by weight of the quantity of caffeine present in the initial solution has been retained with the retentate.

EXAMPLE 4

The procedure is as in Example 3, except that dextrin is used as the macromolecular substance in a quantity corresponding to 5% by weight of the aqueous caffeine solution.

32% by weight of the quantity of caffeine present in the initial solution is retained.

EXAMPLE 5

An aqueous solution containing 1% by weight of strongly cationic polyelectrolyte of the polyamine type (a product of the kind used in industry as a flocculating agent and marketed under the trademark PURIFLOC C31 by DOW CHEMICAL) is prepared and subjected to preliminary ultrafiltration through a semi-permeable membrane of the polyelectrolyte type (membrane marketed by the MILLIPORE COMPANY under the trademark MILLIPORE PSED 0–900 S) under a pressure of the order of 5 kg/cm$^2$, so as to bring the concentration of the retentate to approximately 10% by weight of the polyelectrolyte PURIFLOC. This operation eliminates from the retentate those molecules of this polyelectrolyte which are too small to be retained by the semi-permeable membrane.

The retentate thus obtained is then mixed with an aqueous solution containing chromium in the form of $Cr_2O_7^=$ anions (rinsing water from an electroplating tank) in such a proportion that the homogeneous liquid medium thus obtained contains 50 milligrams of chromium per liter and 1% by weight of the polyelectrolyte PURIFLOC, the pH-value of this medium being of the order of 6 to 7.

This medium is subjected to ultrafiltration through a MILLIPORE PSED 0–900 S semi-permeable membrane under a pressure of 5 kg/cm$^2$.

The rate of flow of liquid through the membrane is 16 l/hour/m$^2$, while the concentration of chromium in the filtrate (measured by spectrophotometry) amounts to 0.5 milligram per liter, which corresponds to a retention of 99% by weight of the chromium present in the initial solution.

EXAMPLE 6

The procedure is as in Example 5, except that a strongly cationic polyelectrolyte of the polyamine type marketed under the trademark CATFLOC P 068 04 B1A (by CHEMVIRON, a subsidiary of the CALGON CORPORATION) is used as the macromolecular substance for fixing $Cr_2O_7^=$ anions in a proportion corresponding to 10 ppm by weight in an aqueous solution containing 5 milligram of chromium per liter.

A retention of 99.5% by weight of the chromium present in the initial solution is obtained with a rate of flow through the membrane of 15 l/hour/m$^2$.

EXAMPLE 7

The procedure is as in Example 6, except that an asymmetrical membrane of cellulose acetate (marketed under the name "DDS 870" by De DANSKE SUKKERFABRIEKEN) is used as the ultrafiltration membrane. A retention of 99% by weight of the chromium

I claim:

1. A process for separating solute molecules or ions with a molecular weight of less than 5000 from a liquid solution thereof, comprising the steps of:
   (a) introducing into said solution at least one macromolecular substance selected from the group consisting of a polyvinylalcohol, polyacrylamide, polyvinylpyrrolidone, polyacrylates, dextrans, dextrins, albumin, pectic acid, polyacrylic acid, strongly cationic polyelectrolyte of the polyamine type and polyamides dissolved or dispersed in the form of a colloid and capable of fixing the said solute molecules or ions to form macromolecular associations of molecules, said macromolecular substance forming a homogeneous liquid phase with said liquid solution before and after fixing the said solute molecules whereby said macromolecular association of molecules remain dissolved or dispersed in said solution;
   (b) allowing at least a substantial fraction of said solute molecules or ions to be fixed by the molecules of said macromolecular substance; and
   (c) passing the homogeneous liquid medium thus obtained through a semipermeable ultrafiltration membrane with a porosity of from 50 to 100,000 Angstroms and capable of retaining the macromolecular association of molecules formed between said macromolecular substance and said solute molecules or ions while allowing the molecules of the solvent of said liquid solution to pass through said membrane.

2. A process as defined in claim 1 wherein said macromolecular substance is in the form of a solution of non-associated macromolecules capable of forming a molecular asociation complex with said substance to be separated, said molecular association complex being selected from the group consisting of proper complexes, chelates and charge-transfer complexes.

3. A process as claimed in claim 2, wherein said macromolecular substance is capable of forming a complex with said substance to be separated.

4. A process as claimed in claim 3, wherein said complex is selected from the group consisting of proper complexes, chelates and charge-transfer complexes.

5. A process as defined in claim 4 wherein said macromolecular substance is selected from the group consisting of polyvinylalcohol, polyacrylamide, polyvinylpyrrolidone polyacrylates, polyacrylic acid and polyamides.

6. A process as defined in claim 1, wherein said macromolecular substance is capable of forming bonds of the reinforced hydrogen bridge type with said substance to be separated.

7. A process as defined in claim 6 wherein said macromolecular substance is selected from the group consisting of polyamides, proteins, polyacids and polysulphonic acids.

8. A process as defined in claim 1 wherein said macromolecular substance is capable of producing interactions of the "dipole-dipole" type with said substance to be separated.

9. A process as defined in claim 1, wherein said macromolecular substance is in the form of a solution or dispersion of macromolecules in the form of microphases.

10. A process as defined in claim 9 wherein said microphases consist of crosslinked macromolecules.

11. A process as defined in claim 10, wherein said macromolecular substance is selected from the group consisting of the following substances: polyvinylalcohol, methoxylated polyvinylether, a copolymer of styrene and maleic anhydride, polyvinylpyrrolidone, polyamides, polyisobutylene, polystyrene and acrylic resins, said subtances being in crosslinked form.

12. A process as defined in claim 9 wherein said microphases consist of branched macromolecules.

13. A process as defined in claim 12 wherein said macromolecular substance is selected from the group consisting of branched polyolefins, amylopectin and branched alignates.

14. A process as defined in claim 9 wherein said macromolecular substance is a surface-active polymer.

15. A process as defined in claim 14 wherein said surface-active polymer is selected from the group consisting of nonylphenoxy-poly(ethyleneoxide) ethanol and a copolymer of propyleneoxide, ethyleneoxide and ethylenediamine.

16. A process as defined in claim 1, wherein said liquid solution is an aqueous solution of caffeine and said macromolecular substance is selected from the group consisting of weakly cross-linked polyvinylalcohol, sodium polyacrylate, albumen and dextrin.

17. A process as defined in claim 1, wherein said liquid solution is an aqueous solution of anions having the formula $Cr_2O_7^=$ and said macromolecular substance is a strongly cationic polyelectrolyte of the polyamine type.

* * * * *